Dec. 6, 1949 S. H. MAGID 2,490,451
METHOD OF MAKING THERMOPLASTIC COVERS
Filed Aug. 11, 1947 4 Sheets-Sheet 1
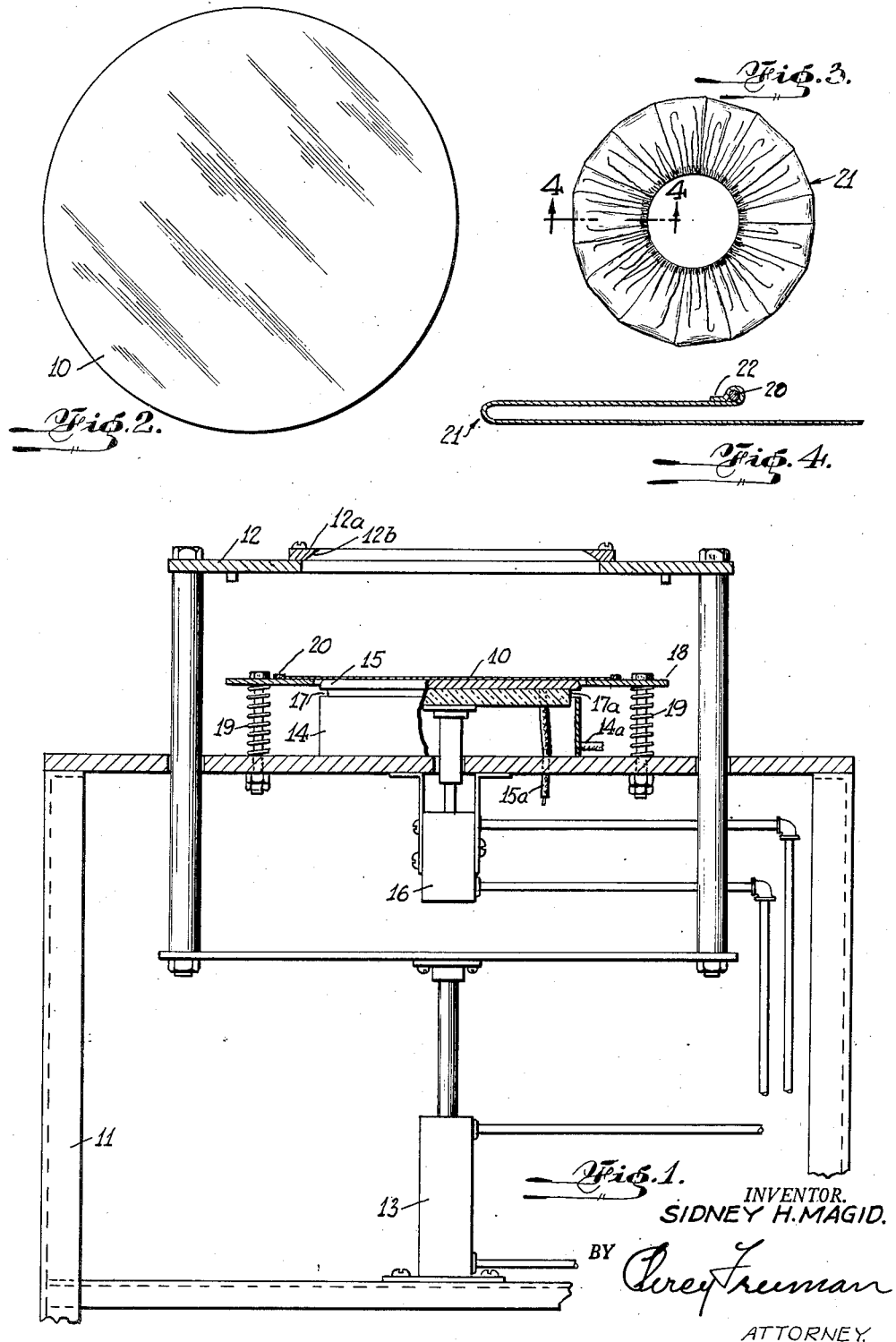
INVENTOR.
SIDNEY H. MAGID.
BY Percy Freeman
ATTORNEY.

Dec. 6, 1949 S. H. MAGID 2,490,451
METHOD OF MAKING THERMOPLASTIC COVERS
Filed Aug. 11, 1947 4 Sheets-Sheet 2

INVENTOR.
SIDNEY H. MAGID.
BY
ATTORNEY.

Dec. 6, 1949   S. H. MAGID   2,490,451
METHOD OF MAKING THERMOPLASTIC COVERS
Filed Aug. 11, 1947   4 Sheets-Sheet 3

INVENTOR.
SIDNEY H. MAGID.
BY
ATTORNEY.

Patented Dec. 6, 1949

2,490,451

UNITED STATES PATENT OFFICE 2,490,451

METHOD OF MAKING THERMOPLASTIC COVERS

Sidney H. Magid, Larchmont, N. Y.

Application August 11, 1947, Serial No. 767,994

17 Claims. (Cl. 154—117)

This invention relates to improved protective coverings for dishes, jars, bowls, the human head, etc. and to a method for making the same. Reference is here made to my Patent No. 2,466,643.

The protective coverings of the type with which the present invention is concerned have heretofore been made by sewing a drawstring or web elastic band to or into a tunnel or hem around to a suitably cut blank of material, usually a transparent plastic material. In addition to being time-consuming, the previous method of fabrication does not produce a durable product since the drawstring or fabric elastic band frequently becomes loose or tears away from the plastic material with continued use and stitching tends to weaken the material.

Accordingly, it is an object of the present invention to provide a rapid method of fabricating a protective covering of the character indicated, the protective covering having improved qualities of strength and durability.

A further object of the invention is the provision of a method whereby an elastic band of rubber or the like or other constricting band may be positioned adjacent the marginal edge of a blank of thermoplastic material, the thermoplastic material being then folded or squeezed about the band to form contiguous, adjacent plies thereabout, heat being then applied to the contiguous plies or layers of thermoplastic material to seal the elastic band therewithin.

An additional object of the invention is the provision of a method of the character indicated wherein the thermoplastic material from which the protective coverings are formed, may be fed from a web or sheet in timed sequence with the operation of a blank-cutting and heat-sealing means for rapid and efficient production of the protective coverings.

The foregoing objects, as well as additional objects and advantages of the invention will be readily apparent in the course of the following detailed description taken in connection with the accompanying drawings which illustrate several embodiments of the invention, and wherein:

Fig. 1 is a front elevational view of a device for forming protective coverings from pre-cut blanks of material.

Fig. 2 is a plan view of a circular blank or disc of thermoplastic material from which the protective covering may be formed.

Fig. 3 is a bottom plan view of a finished protective covering.

Fig. 4 is a sectional view taken along line 4—4 of Fig. 3, showing the elastic band sealed between the contiguous folds of the thermoplastic material.

Fig. 16 is a schematic wiring diagram showing the relation of the switches to the motor circuit.

Figure 5:
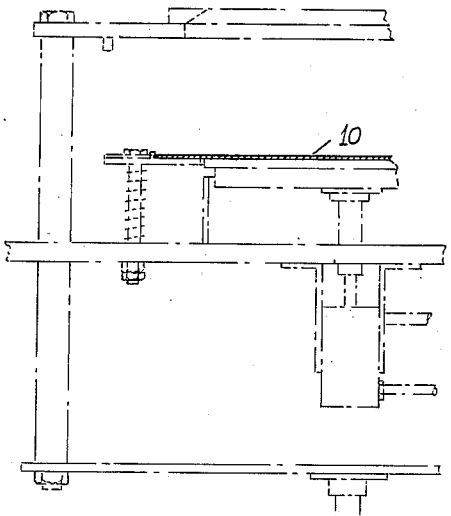
Figs. 5 to 9 are fragmentary views illustrating the sequential steps in the formation of the protective covering using the device of Fig. 1.

The protective coverings of the invention which, for convenience, will hereafter be referred to as bowl covers, may be made from any suitable thermoplastic material, as for instance, vinyl resin sheeting, or polyethylene and the like. In the practice of the invention using the device illustrated in Fig. 1 and Figs. 5–10, the thermoplastic material is pre-cut in any suitable manner to form a circular blank or disc 10, as shown in Fig. 2.

The device upon which the disc 10 is formed into a bowl cover comprises a suitable framework 11, upon which is mounted a reciprocable forming plate 12, which may be actuated by a valve-controlled air cylinder 13 or other suitable means. A centrally positioned cylindrical die base 14 is fixed to framework 11 below forming plate 12, for the reception of a movable die head 15, said die head being activated toward and away from die base 14 by a valve-controlled air cylinder 16, or other suitable means. Die head 15 is formed adjacent the top thereof with an annular recess 17 for a purpose to be fully described hereinafter.

A depressible positioning plate 18 having a central aperture to expose die head 15 is also mounted on framework 11 intermediate die head 15, and forming plate 12. Springs 19 serve to normally retain plate 18 in raised position (Fig. 1). Plate 18 carries a guide ring 20 which serves to properly center and locate the thermoplastic disc 10 with respect to the die head 15. Forming plate 12 is provided with a forming ring 12a which is preferably beveled downwardly and outwardly as shown at 12b in Fig. 1. Electrical conduits 14a and 15a connect die base 14 and die head 15 respectively to a high frequency source.

Figure 6:
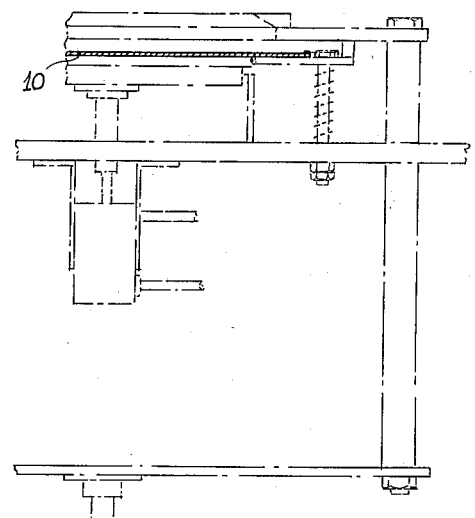
Figure 7:
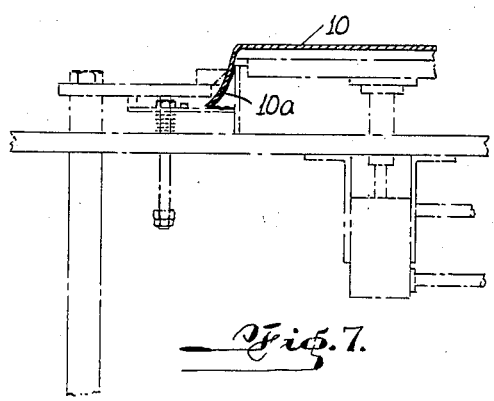
Figure 8:
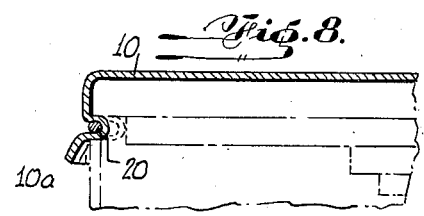

In forming the above covers, the pre-cut thermoplastic disc or blank 10 is placed on positioning plate 18 within guide ring 20, as shown in Figs. 1 and 5. The valve control (not shown) for cylinder 13 is then operated to bring down forming plate 12 against positioning plate 18, as shown in Fig. 6. The continued downward movement of forming plate 12 carries positioning plate 18 below the level of die head 15 to simultaneously bring disc 10 to rest against the top of die head 15 and to form a depending skirt 10a down around said die head, as clearly shown in Fig. 7. An elastic band 20 of rubber or the like is then applied around the thermoplastic disc 10 at the level of the annular groove 17 in die head 15.

Figure 9:
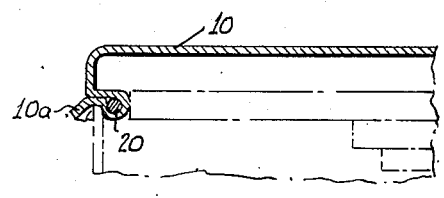

As clearly shown in Fig. 9, elastic band 20 contracts the thermoplastic material of the depending skirt into the annular groove 17, the band 20 to be contained finally within adjacent contiguous folds of the disc 10, and resting against the limiting element 17a. The skirt 10a of disc 10 is permitted to flare outwardly by the presence of the bevel 12b on forming ring 12a of forming plate 12.

The valve-control for cylinder 13 is next operated to return forming plate 12 to the initial position (Fig. 1) thereby also releasing positioning plate 18 which is urged to its initial rest position (Fig. 1) by means of springs 19. It will be noted that after the return of forming plate 12 and positioning plate 18 to their respective rest positions above die head 15 and die base 14 the disc 10 will be held to die head 15 by means of the elastic band 20 applied within annular groove 17.

The valve control (not shown) for cylinder 16 is next operated to move die head 15 downwardly toward die base 14, thereby firmly squeezing together the doubled-over folds of the thermoplastic disc 10 within groove 17 and enclosing band 20 completely within said doubled-over folds. Electrical energy is simultaneously applied to the doubled-over folds of disc 10 outwardly of elastic band 20 and between the closely adjacent surfaces of die head 15 and die base 14, to completely seal the elastic band 20 within said doubled-over folds. The valve control for cylinder 16 is next operated to bring die head 15 up to its original position (Fig. 1) away from die base 14, after which the finished article may be removed from said die head by depressing slightly positioning plate 18.

Upon removal of the finished article from die head 15 the elastic band 20 will contract to its normal diametral size to produce the bowl cover 21 (Fig. 3) which is in the form of a flexible hollow body of thermoplastic material having an opening of variable diametral size by reason of the presence of the elastic band 20 sealed within the contiguous doubled-over folds of thermoplastic material, as shown at 22 in Fig. 4.

Figure 10:
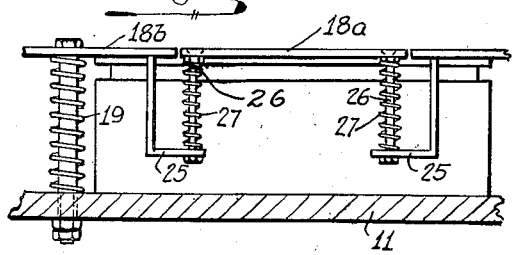
Fig. 10 is a fragmentary detail view of a modified form of device employing depressible clearance sections facilitating the convenient removal of the sealed protective covering.
Figure 12:
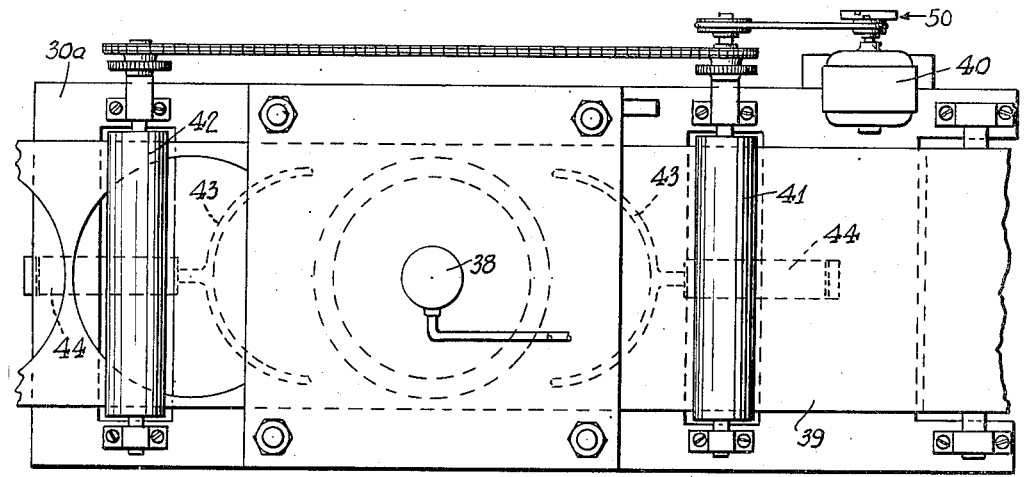
Fig. 12 is a top plan view of the apparatus of Fig. 11.

Fig. 10 illustrates the use of a depressible clearance section in positioning plate 18b for facilitating the removal of the finished protective covering having the elastic band 20 sealed within the doubled-over folds thereof. A portion of positioning plate 18b is cut away to allow mounting of depressible clearance sections 18a. Plate 18b may have fixed thereto a pair of L-shaped, depending bracket supports 25. Clearance section 18a may be mounted on pins 26 passing through the base of each bracket support 25, said clearance section being depressible against the action of lightweight springs 27 interposed between each of said clearance sections and the base of each bracket support 25. If desired, a pair of such clearance sections 18a may be positioned on diametrically opposite sides of die head 15 for easy removal of the finished bowl cover without the necessity of depressing the entire positioning plate 18 as is required in the apparatus of the initial embodiment.

Referring now to the embodiment of the invention illustrated in Figs. 11 to 15, there is illustrated an arrangement for intermittently feeding a roll of thermoplastic material to a combined blank-cutting and forming die in timed sequence with the operation of said die. The die may be considered as comprising three portions:

(A) A cylindrical die base fixed to the frame of the apparatus.

(B) A sealing die head mounted above said die base and forming, together with the die base, an annular groove therewithin.

(C) A cutting and forming die portion movable toward and away from said die base and sealing head for intermittently feeding and forming cut blanks of thermoplastic material.

The thermoplastic material is intermittently fed past the cutting die portion of the die assembly in timed sequence with the operation of the die assembly as by means of a motor-driven roller system, the roller system being actuated at the termination of the upstroke of the cutting die as by means of a circuit-closing switch and a rotary contact brush. A pair of laterally disposed arcuate forming members is arranged to reciprocate at the beginning of the upstroke of the cutting die to force the plastic material within the annular groove of the sealing die head, thereby preparing the material, more readily to receive the elastic band and to hold said material in the groove prior to the application of the elastic band over the plastic material within the groove and the final sealing operation.

Figure 11:
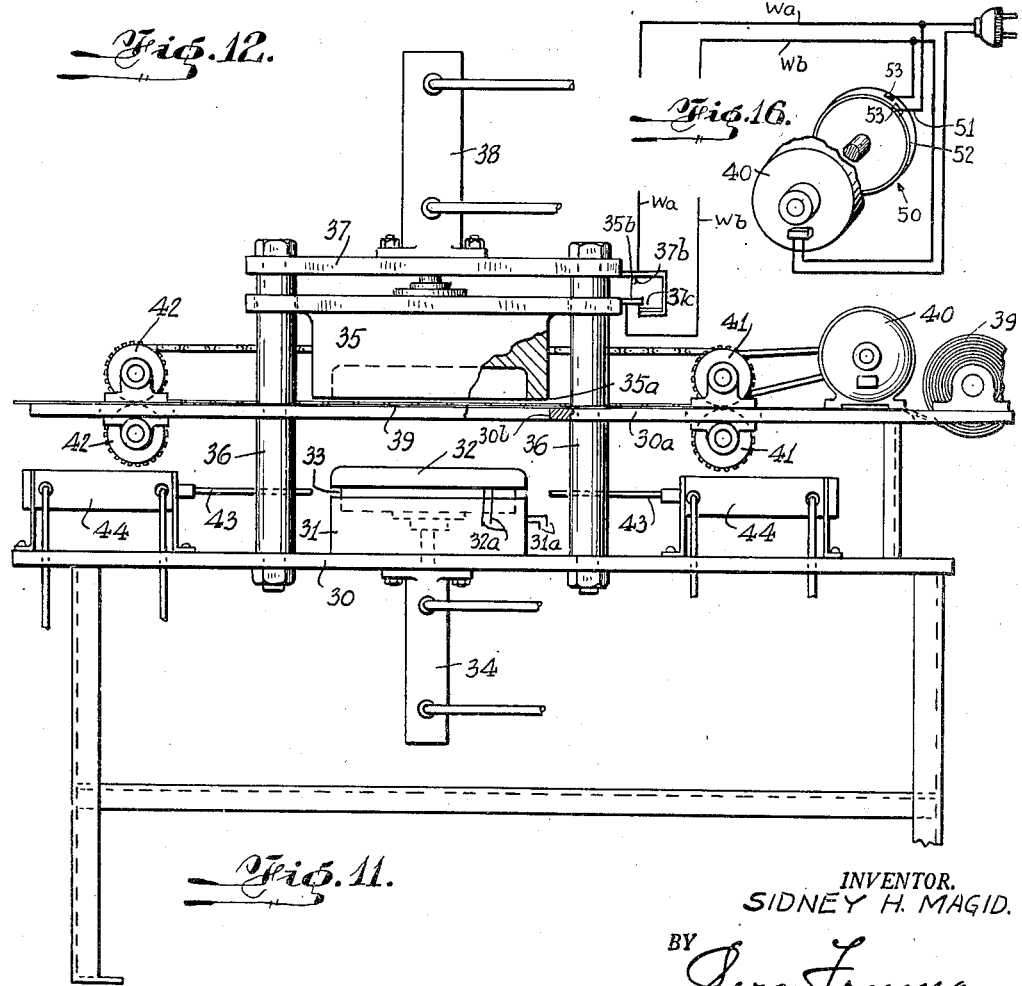
Fig. 11 is an elevational view of a modification of the apparatus for forming the protective coverings directly from an intermittently fed roll of thermoplastic material.

Fig. 11 shows the framework 30 upon which is mounted the cylindrical die base 31 carrying the movable sealing die head 32. Die head 32 forms an annular groove 33 with base 31 and is actuated by a valve-controlled double acting air cylinder 34.

Electrical conduits 31a and 32a connect the die base 31 and the die head 32 with a high frequency source.

Cutting and forming die portion 35 rides on pins 36 secured at their lower ends to framework 30 and at their upper ends to a top plate 37. Cutting die portion 35 may be actuated by a double-acting valve-controlled air cylinder 38 fixed to top plate 37 or by other suitable means.

A roll of thermoplastic film material 39, a motor 40, a pair of feed rollers 41 and a pair of take-off rollers 42 may be mounted on frame portion 30a at a suitable level above sealing die head 32 and die base 31. Thermoplastic film 39 is fed past the cutting die portion 35 by means of the intermittently actuated motor 40 in time sequence with the completion of the upstroke of said cutting die portion so that a fresh portion of film will be positioned therebeneath for cutting a new blank by the outer peripheral cutting edge 35a. One convenient manner of obtaining the proper intermittent feed of thermoplastic film is by means of spring switch contacts 35b secured to the cutting die portion 35 and 37b secured to the top plate 37 said contacts forming a part of the electrical circuit to the motor 40 for actuating the roller system. Contact 35b may be rigid while contact 37b may be a flexible arm. The upper or inner side of contact 37b may carry a piece of insulation 37c so that as the cutting die moves downwardly, the contact 35b will contact the insulation 37c and because of the flexibility of contact 37b, contact 35b will wipe past contact 37b without closing the motor circuit. However, when die 35 moves upwardly contact 35b will close the motor circuit as it is wiping past contact 37b and the motor will then turn rotary contact 50 so that brush 51 rides on the metal band 52, thus maintaining the motor circuit closed until the insulation insert 53 again reaches the brush 51 at which time the motor circuit is broken. Any other conventional arrangement may be used for attaining this result other than the momentary contact arrangement at the termination of the upstroke of cutting die portion 35.

A pair of arcuate forming members 43 is provided for cooperation with the annular groove 33 formed by sealing die head 32, and die base 31, to form a blank of thermoplastic material about said die head in a manner to be fully described here in below. Each of the arcuate forming members 43 may be actuated simultaneously by a valve-controlled air cylinder 44 or other suitable means.

Figure 13:
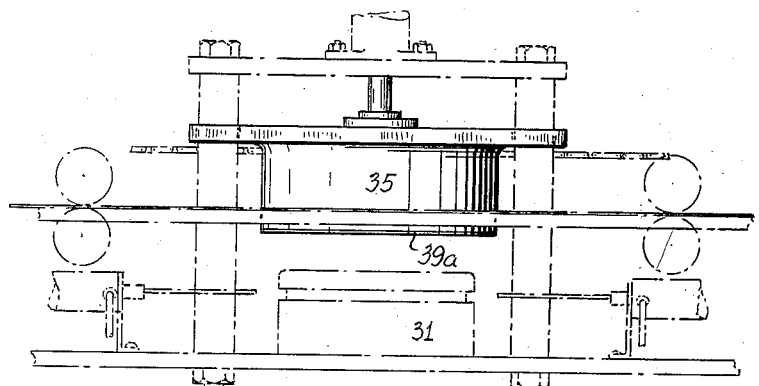
Figs. 13, 14 and 15 are fragmentary detail views illustrating sequential steps in the formation of the protective coverings using the apparatus illustrated in Figs. 11 and 12.
Figure 14:
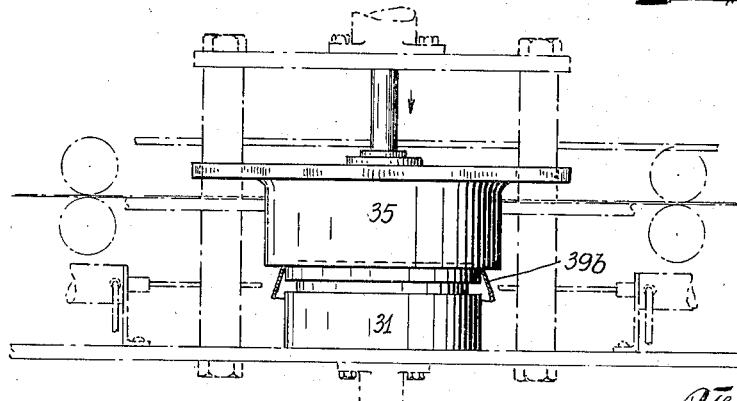

In actual operation of the apparatus, valve-controlled cylinder 38 is actuated to move cutting punch 35 downwardly past frame portion 30a, which has cutting die opening 30b and toward die head 32. Simultaneously with the downward motion of cutting die punch 35, a blank 39a of thermoplastic material is cut from the thermoplastic film 39 (Fig. 13). The diameter of cutting edge 35a is greater than the diameter of die head with sufficient material remaining to form a skirt portion 39b (Fig. 14).

Figure 15:
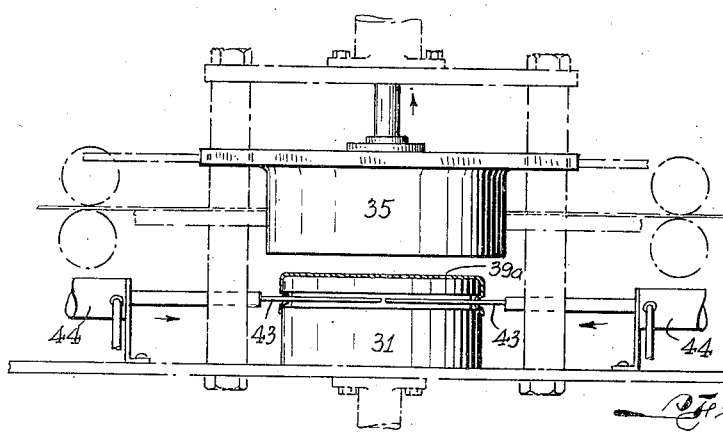

Arcuate forming members 43 are actuated by valve-controlled cylinders 44 at the beginning of the upstroke of cutting die punch 35 to securely form skirt portion 39b down around die head 32 and to force a portion of said skirt within annular groove 33 to conform therewith (Fig. 15). An elastic band (not shown) may then be applied within the annular groove 33 over the skirt portion 39b. The arcuate members 43 are then withdrawn through instrumentality of cylinders 44 and cylinder 34 may then be actuated to move sealing die head 32 downwardly to squeeze the doubled-over folds about the enclosed elastic band and heating energy is then applied through the contiguous doubled-over folds to seal the elastic band therewithin. After sealing, the cylinder 34 is operated to raise die-head 32 to its initial raised position away from die base 31 in order that the finished, thermoplastic bowl cover may be removed, the cover (upon contraction of the elastic band) assuming substantially the form and structure illustrated in Figs. 3 and 4 in connection with the initial embodiment of the invention.

It is apparent from the foregoing that the invention provides an improved method for forming a bowl cover or other protective covering of thermoplastic material having a flexible hollow body provided with an opening of variable size. Various types of protective coverings may be produced by the practice of the invention, for example, protective coverings for bowls, dishes, jars, and the like, bathing caps, etc.

Since certain modifications may be made in the protective coverings of the invention, as well as in the method for making the same, it is intended that all matter contained in the foregoing description and shown in the accompanying drawings be interpreted merely as illustrative and not in a limiting sense.

Having thus described my invention, what I claim as new and desire to secure by Letters Patent, is:

1. The method of making a protective covering of flexible thermoplastic sheet material having an expandable opening, with the aid of a form, which has an annular groove therearound, and an elastic constricting element; said method comprising positioning said material over said form and past said groove, applying said element under stretched condition over the material opposite said groove, and releasing said element to permit it to contract to draw a portion of said material into said groove to form a doubled-over fold of thermoplastic material around said element, then pressing together the entire doubled-over fold, then heat-sealing said doubled-over fold to confine said element therein.

2. The method described in claim 1, in which the pressing together of the entire doubled-over hem or fold is done simultaneously.

3. The method described in claim 1, in which the heat-sealing of the entire doubled-over hem is done simultaneously.

4. The method described in claim 1, in which the pressing together of the entire doubled-over hem or fold is done simultaneously, and the heat-sealing of the entire doubled-over hem is done simultaneously.

5. The method described in claim 1, in which the pressing together and the heat-sealing of the entire doubled-over hem are done simultaneously.

6. The method of making a protective covering of flexible thermoplastic sheet material having an expandable opening, with the aid of a form, and an elastic constricting element; said method comprising positioning of said material over said form, applying said element over said material adjacent the peripheral edge thereof, then forming a doubled-over fold around said element, then pressing together the entire doubled-over fold, then heat-sealing said doubled-over fold to confine said element therein.

7. The method described in claim 6, in which the doubled-over folding of the entire peripheral portion of the material is done simultaneously.

8. The method described in claim 6, in which the pressing together of the entire doubled-over hem or fold is done simultaneously.

9. The method described in claim 6, in which the heat-sealing of the entire doubled-over hem is done simultaneously.

10. The method described in claim 6, in which the doubled-over folding of the entire peripheral portion of the material is done simultaneously, and in which the pressing together of the entire doubled-over hem or fold is done simultaneously.

11. The method described in claim 6, in which the doubled-over folding of the entire peripheral portion of the material is done simultaneously, in which the pressing together of the entire doubled-over hem or fold is done simultaneously, and in which the heat-sealing of the entire doubled-over hem is done simultaneously.

12. The method described in claim 6, in which the doubled-over folding of the entire peripheral portion of the material is done simultaneously, and the heat-sealing of the entire doubled-over hem is done simultaneously.

13. The method described in claim 6, in which the pressing together of the entire doubled-over hem or fold is done simultaneously, and the heat-sealing of the entire doubled-over hem is done simultaneously.

14. The method described in claim 6 in which the pressing together and the heat-sealing of the entire doubled-over hem are done simultaneously.

15. The method of making a protective covering of flexible thermoplastic sheet material having an expandable opening, with the aid of a form and an elastic constricting element, said method comprising positioning of said material over said form, applying said element over said material adjacent the peripheral edge thereof, then forming a doubled-over fold simultaneously around the entire peripheral portion of said element, and then uniting said doubled-over fold to confine said element therein.

16. The method of making a protective covering of flexible thermoplastic sheet material having an expandable opening, with the aid of a form and an elastic constricting element, said method comprising positioning of said material over said form, applying said element over said material adjacent the peripheral edge thereof, then forming a doubled-over fold around said element, and then uniting simultaneously said entire doubled-over fold to confine said element therein.

17. The method of making a protective covering of flexible thermoplastic sheet material having an expandable opening, with the aid of a form which has an annular groove therearound, and an elastic constricting element; said method comprising positioning said material over said form and past said groove, applying said element under stretched condition over the material opposite said groove, forming a doubled-over fold of thermo-plastic material around said element, by releasing said element to permit it to contract to draw a portion of said material into said groove, then uniting said doubled-over fold to confine said element therein, said uniting of the entire doubled-over fold being performed simultaneously.

SIDNEY H. MAGID.

REFERENCES CITED

The following references are of record in the file of this patent:

UNITED STATES PATENTS

| Number | Name | Date |
| --- | --- | --- |
| 169,408 | Brown | Nov. 2, 1875 |
| 1,544,312 | Gray | June 30, 1925 |
| 1,997,738 | Maxedon | Apr. 16, 1935 |
| 2,080,108 | Brandstein | May 11, 1937 |
| 2,125,495 | French | Aug. 2, 1938 |
| 2,266,459 | Gilbert | Dec. 16, 1941 |
| 2,289,618 | Young | July 14, 1942 |
| 2,379,357 | Humphrey | June 26, 1945 |
| 2,386,147 | Sidebotham | Oct. 2, 1945 |
| 2,424,558 | Delano | July 29, 1947 |
| 2,432,662 | Gardner | Dec. 16, 1947 |